(12) United States Patent
Mierau et al.

(10) Patent No.: US 7,853,564 B2
(45) Date of Patent: Dec. 14, 2010

(54) ADDING METADATA TO A STOCK CONTENT ITEM

(75) Inventors: Peter Mierau, Alamo, CA (US); Rick S. Seeler, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 276 days.

(21) Appl. No.: 10/943,767

(22) Filed: Sep. 17, 2004

(65) Prior Publication Data
US 2006/0064418 A1 Mar. 23, 2006

(51) Int. Cl.
*G06F 17/30* (2006.01)
(52) U.S. Cl. .................................................. 707/638
(58) Field of Classification Search ................ 707/203, 707/101, 638
See application file for complete search history.

(56) References Cited

U.S. PATENT DOCUMENTS

| | | | | |
|---|---|---|---|---|
| 5,164,831 | A * | 11/1992 | Kuchta et al. | 348/231.7 |
| 5,218,455 | A * | 6/1993 | Kristy | 358/403 |
| 5,440,401 | A * | 8/1995 | Parulski et al. | 386/124 |
| 5,926,624 | A * | 7/1999 | Katz et al. | 709/217 |
| 6,006,231 | A * | 12/1999 | Popa | 707/101 |
| 6,405,203 | B1 * | 6/2002 | Collart | 707/10 |
| 6,629,104 | B1 * | 9/2003 | Parulski et al. | 707/102 |
| 6,792,466 | B1 * | 9/2004 | Saulpaugh et al. | 709/229 |
| 7,051,019 | B1 * | 5/2006 | Land et al. | 707/4 |
| 7,110,965 | B1 * | 9/2006 | Pierce | 705/26 |
| 7,225,158 | B2 * | 5/2007 | Toshikage et al. | 705/51 |
| 7,558,781 | B2 * | 7/2009 | Probst et al. | 707/3 |
| 2002/0029150 | A1 * | 3/2002 | Vitale et al. | 705/1 |

(Continued)

FOREIGN PATENT DOCUMENTS

EP 1077414 2/2001

(Continued)

OTHER PUBLICATIONS

"What is ShutterPoint?" by ASE Research Corp. Provided by Archive.org WayBack Machine. Created Jun. 25, 2003. Accessed Dec. 5, 2007. Available online at http://web.archive.org/web/20030625120521/http://www.shutterpoint.com/Home-Photographer.cfm.*

(Continued)

*Primary Examiner*—Neveen Abel Jalil
*Assistant Examiner*—Mark Andrew X Radtke
(74) *Attorney, Agent, or Firm*—Fish & Richardson P.C.

(57) ABSTRACT

Methods and apparatus, including computer program products, implementing techniques for retrieving a first version copy of a first stock content item from a first content hosting server storing a plurality of stock content items, each item having one or more stock content versions, each item having a content identifier that uniquely identifies the item at the first content hosting server; adding identifier metadata to the first version copy, the identifier metadata including the content identifier of the first stock content item, and storing the first version copy with the added metadata as a first designer copy in a designer storage for later use in a designer system; and in connection with a user interaction with the designer system involving the first designer copy, using the identifier metadata from the first designer copy to retrieve a second version copy of the first item from the first content hosting server.

30 Claims, 11 Drawing Sheets

U.S. PATENT DOCUMENTS

| | | | | |
|---|---|---|---|---|
| 2002/0143976 | A1* | 10/2002 | Barker et al. | 709/231 |
| 2002/0156685 | A1* | 10/2002 | Ehrlich et al. | 705/26 |
| 2003/0182402 | A1 | 9/2003 | Goodman et al. | |
| 2004/0133923 | A1* | 7/2004 | Watson et al. | 725/134 |
| 2004/0143597 | A1* | 7/2004 | Benson et al. | 707/104.1 |
| 2005/0021550 | A1* | 1/2005 | Grasland et al. | 707/102 |
| 2005/0036158 | A1* | 2/2005 | House et al. | 358/1.9 |
| 2005/0058319 | A1 | 3/2005 | Rhoads et al. | |
| 2005/0132120 | A1* | 6/2005 | Vijay | 711/100 |

FOREIGN PATENT DOCUMENTS

| | | |
|---|---|---|
| EP | 1077414 A3 | 8/2004 |

OTHER PUBLICATIONS

Skonnard, Aaron. "Understanding SOAP" MSDN, Mar. 2003. Available online at http://msdn.microsoft.com/en-us/library/ms995800.aspx.*

Adobe Systems Incorporated, "eXtensible Metadata Platform (XMP)", 2002, http://www.adobe.com/products/xmp/main.html, retrieved Sep. 21, 2005, 2 pages.

Brickley, Dan; et al. "Resource Description Framework (RDF) Schema Specification", 1999, http://www.w3.org/TR/1999/PR-rdf-schema-19990303/ , retrieved Sep. 21, 2005, 36 pages.

Digital Imaging Group "DIG2000 File Format Proposal", Oct. 1998 ISO/IEC JTC1/SG29/WG1N1017, http://www.i3a.org/pdf/wg1n1017.pdf, retrieved Sep. 21, 2005, 113 pages.

Dublin Core Metadata Initiative, "Dublin Core Metadata Element Set", Version 1.1, Jul. 1999, http://dublincore.org/documents/1999/07/02/dces/. retrieved Sep. 21, 2005, 5 pages.

Fielding, Roy, et. al. "Hypertext Transfer Protocol—HTTP/1.1" Jun. 1999, ftp://ftp.isi.edu/in-notes/rfc2616.txt, retrieved Sep. 21, 2005, 165 pages.

Hamilton, "JPEG File Interchange Format", C-Cube Microsystems, Sep. 1992, http://www.w3.org/Graphics/JPEG/jfif3.pdf, retrieved Sep. 21, 2005, 9 pages.

Hunter, et al., "An Indexing and Querying System for Online Images Based on the PNG Format and Embedded Metadata in: ARLIS/ANZ", Sep. 1999, http://archive.dstc.edu.au/RDU/staff/jane-hunter/PNG/paper.html, retrieved Sep. 21, 2005, 20 pages.

International Press Telecommunications Counsil, "IPTC Standards: IPTC Core Schema for XMP Version 1.0 Specification Document Revision 8", 2005, IPTC, 15 pages.

Joint Photographers Expert Group (JPEG), "Jpeg 2000 image coding system", Mar. 16, 2000 Final Committee Draft Version 1.0 ISO/IEC CD15444-1:2000, http://www.jpeg.org/public/fcd15444-1.pdf, retrieved Sep. 21, 2005, 192 pages.

Lafon, et al. "Jigsaw 2.0 internal design" Jul. 1999, http://www.w3.org/Jigsaw/Doc/Programmer/design.html, retrieved Sep. 21, 2005, 9 pages.

Lassila, et al., "Resource Description Framework (RDF) Model and Syntax Specification", Feb. 1999, http://www.w3.org/TR/1999/REC-rdf-syntax-19990222/ , retrieved Sep. 21, 2005, 47 pages.

Wolf, et al. "Date and time formats" Sep. 1997. Submission to W3C. URL: http://www.w3.org/TR/1998/NOTE-datetime-19980827 , retrieved Sep. 21, 2005, 3 pages.

Examination Report, issued by the Intellectual Property Office of Great Britain, dated Jul. 5, 2007, in corresponding GB Application Serial No. 0518994.9.

Office Action for Chinese Application Serial No. 200510109665.7 (corresponding to U.S. Appl. No. 10/943,767), to be published by USPTO as part of file history, 15 pages.

Lafon, Yves et al., "Describing and retrieving photos using RDF and HTTP," Apr. 19, 2002, http://www.w3.org/TR/photo-rdf/, retrieved Jul. 7, 2010, 9 pages.

* cited by examiner

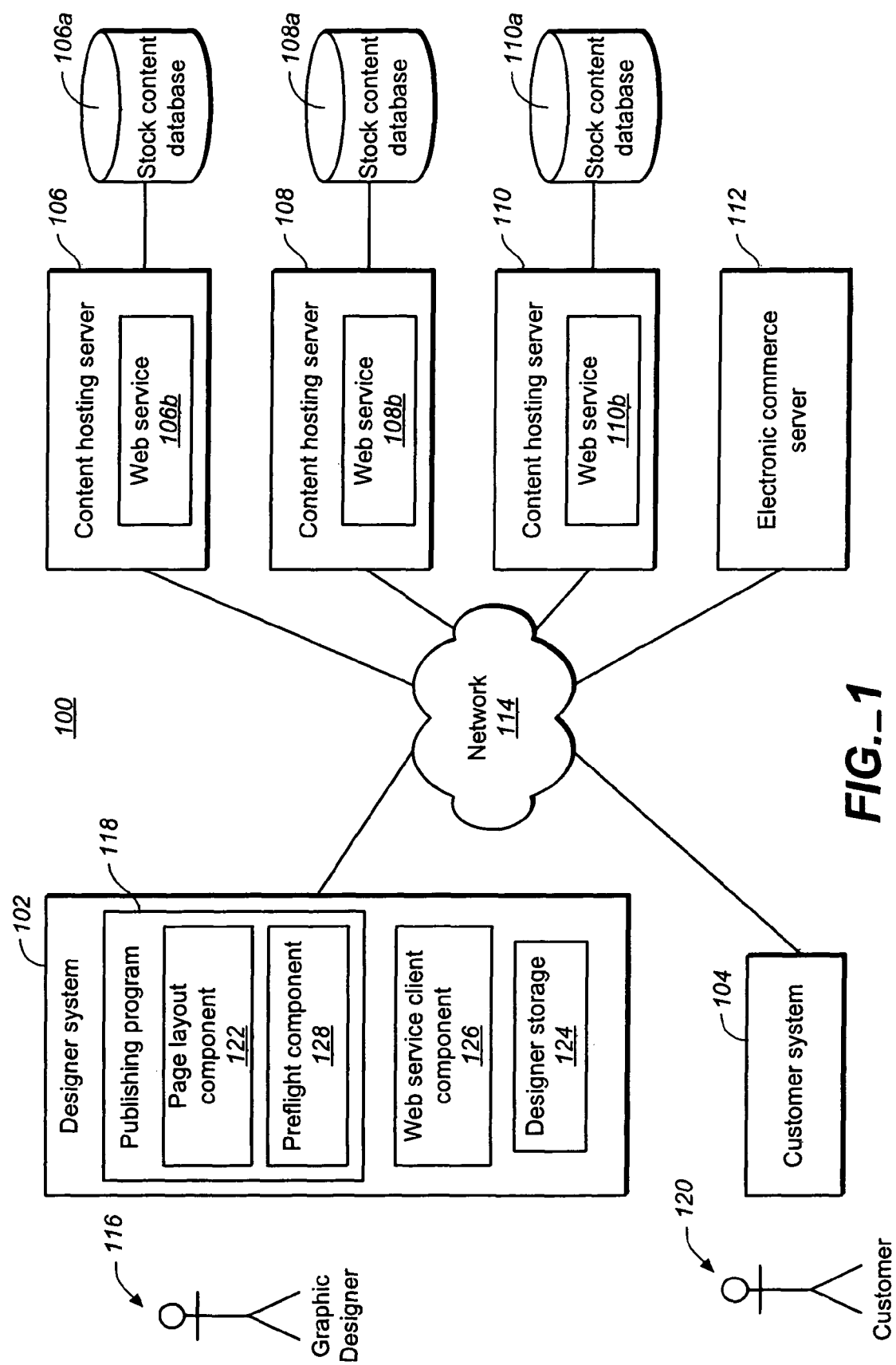
FIG._1

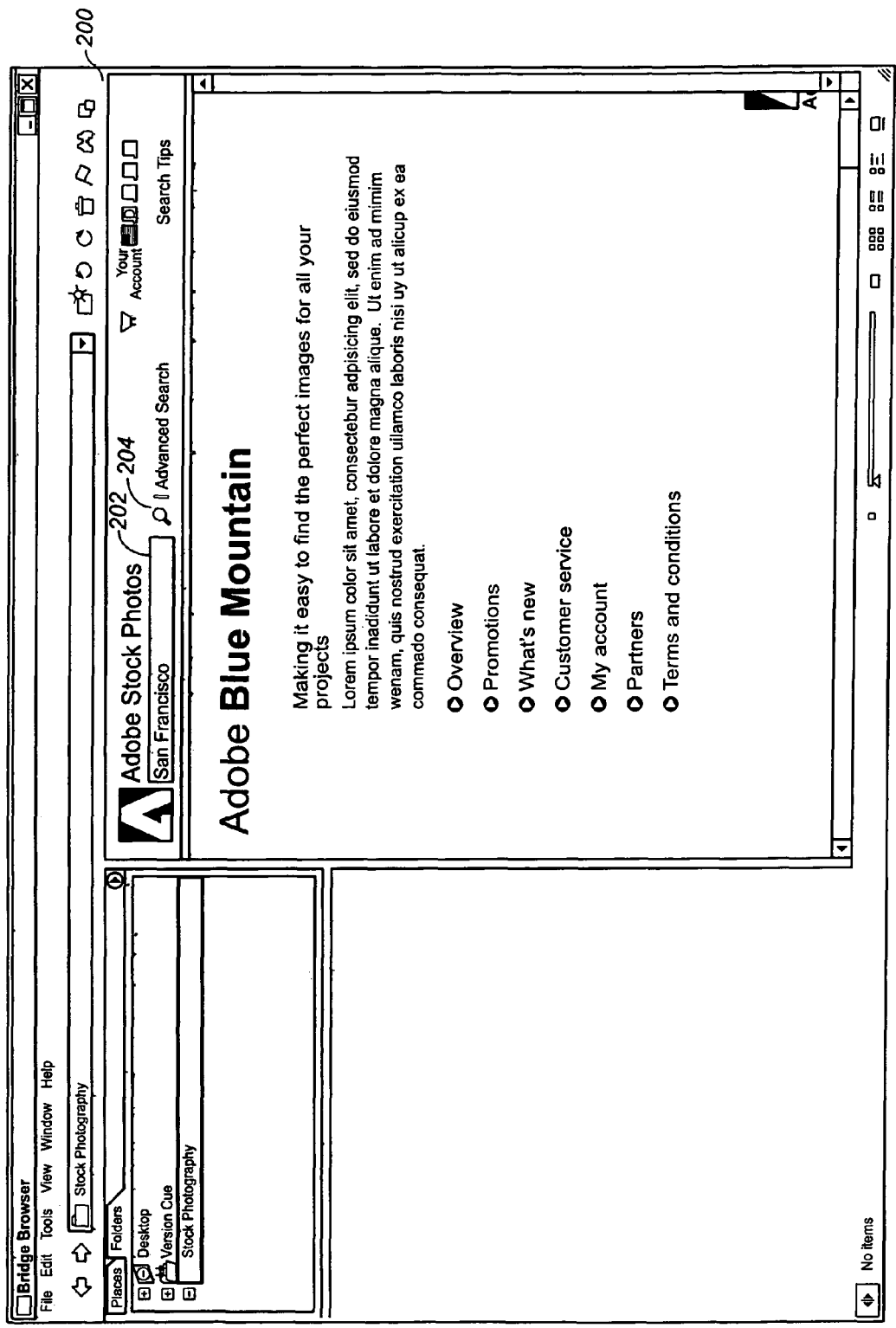
FIG._2a

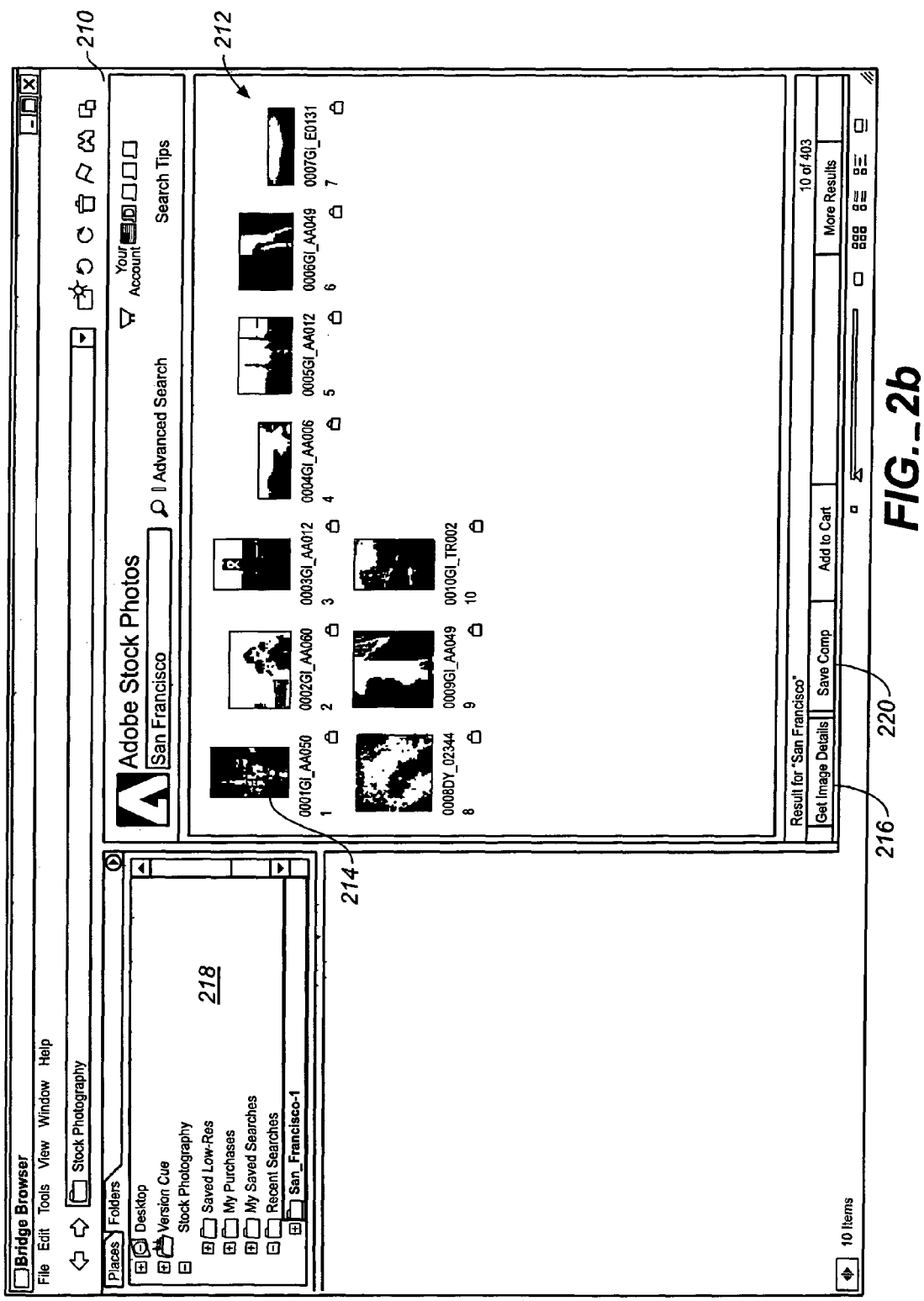
FIG._2b

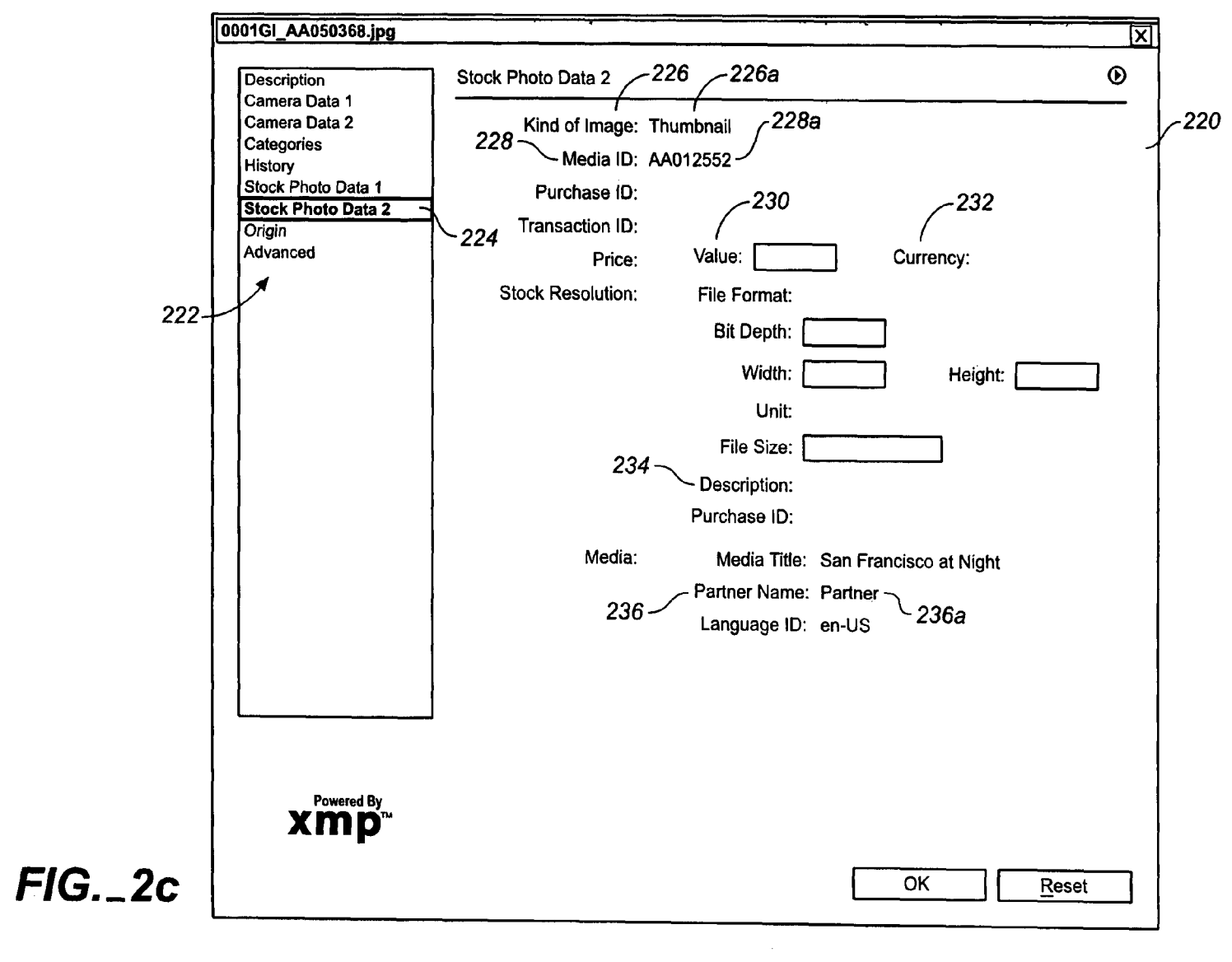

FIG._2c

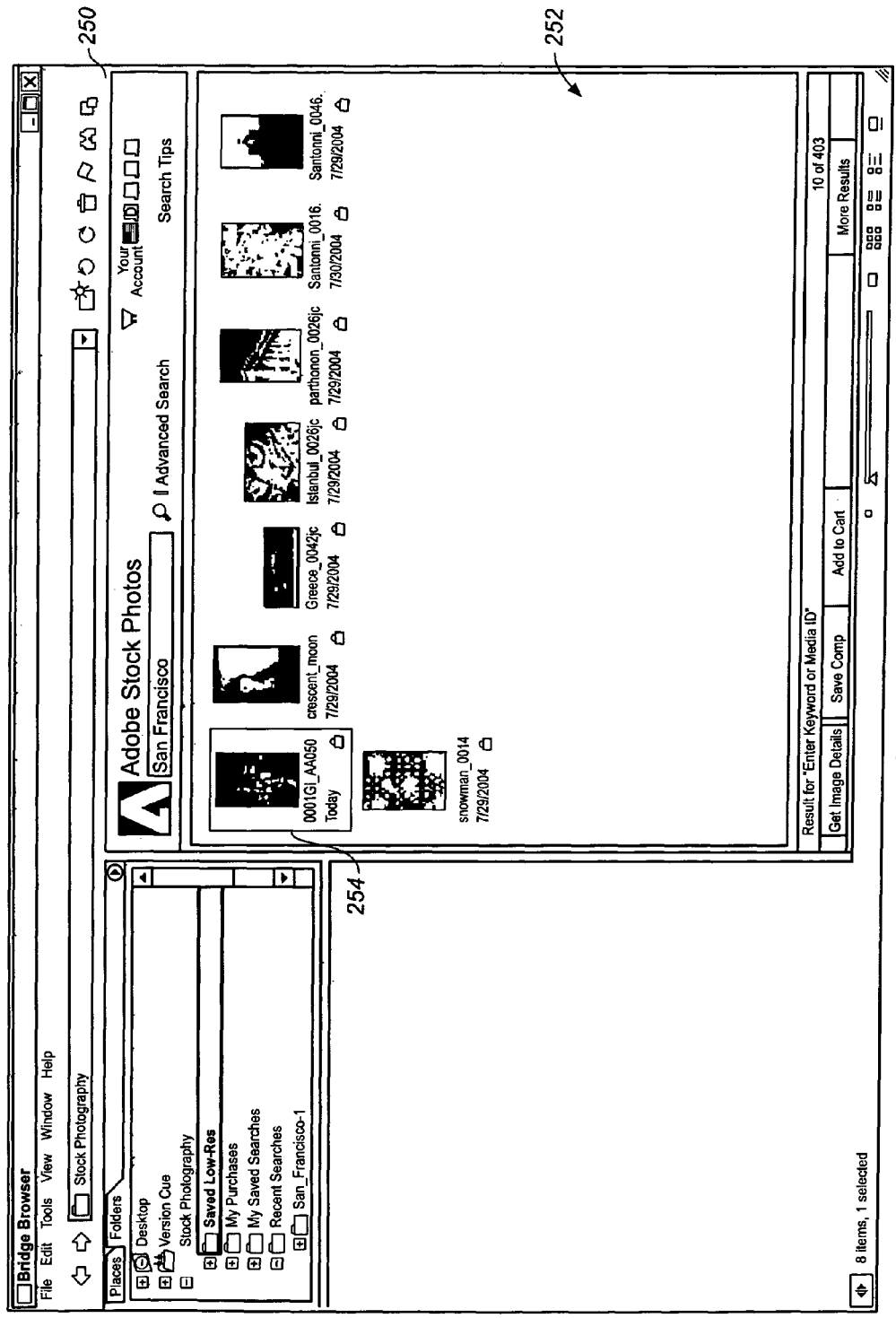
FIG._2d

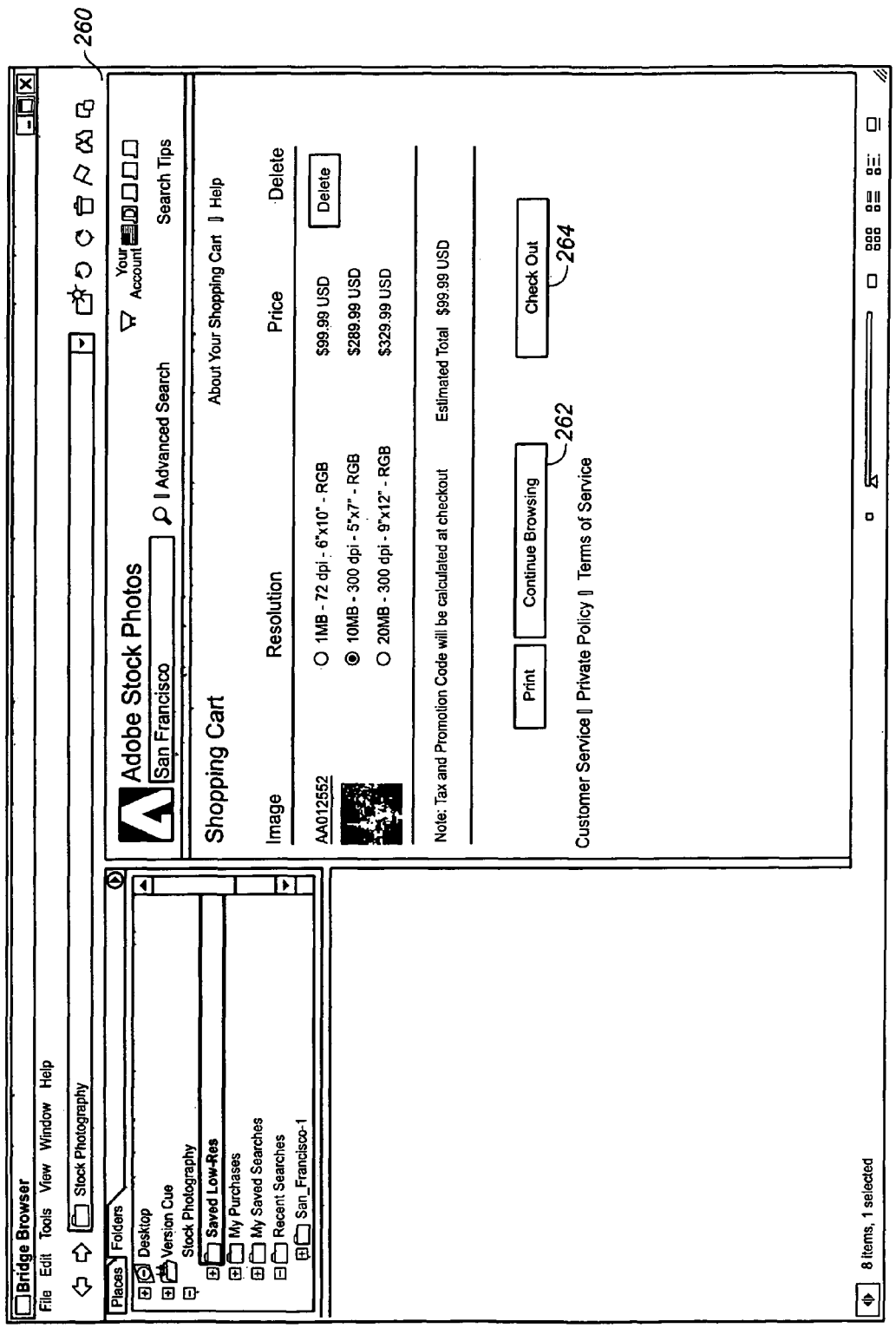
FIG._2e

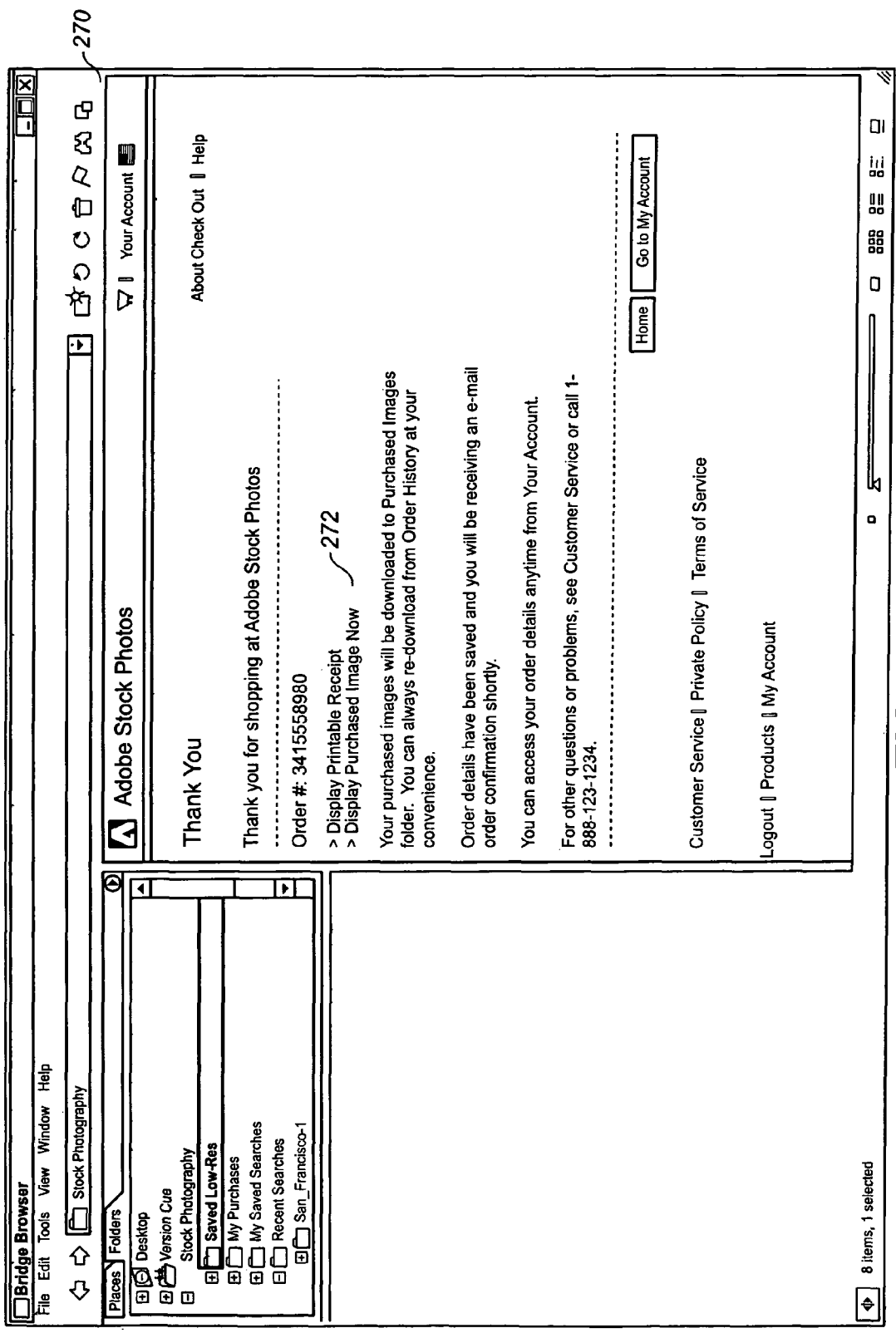
FIG._2f

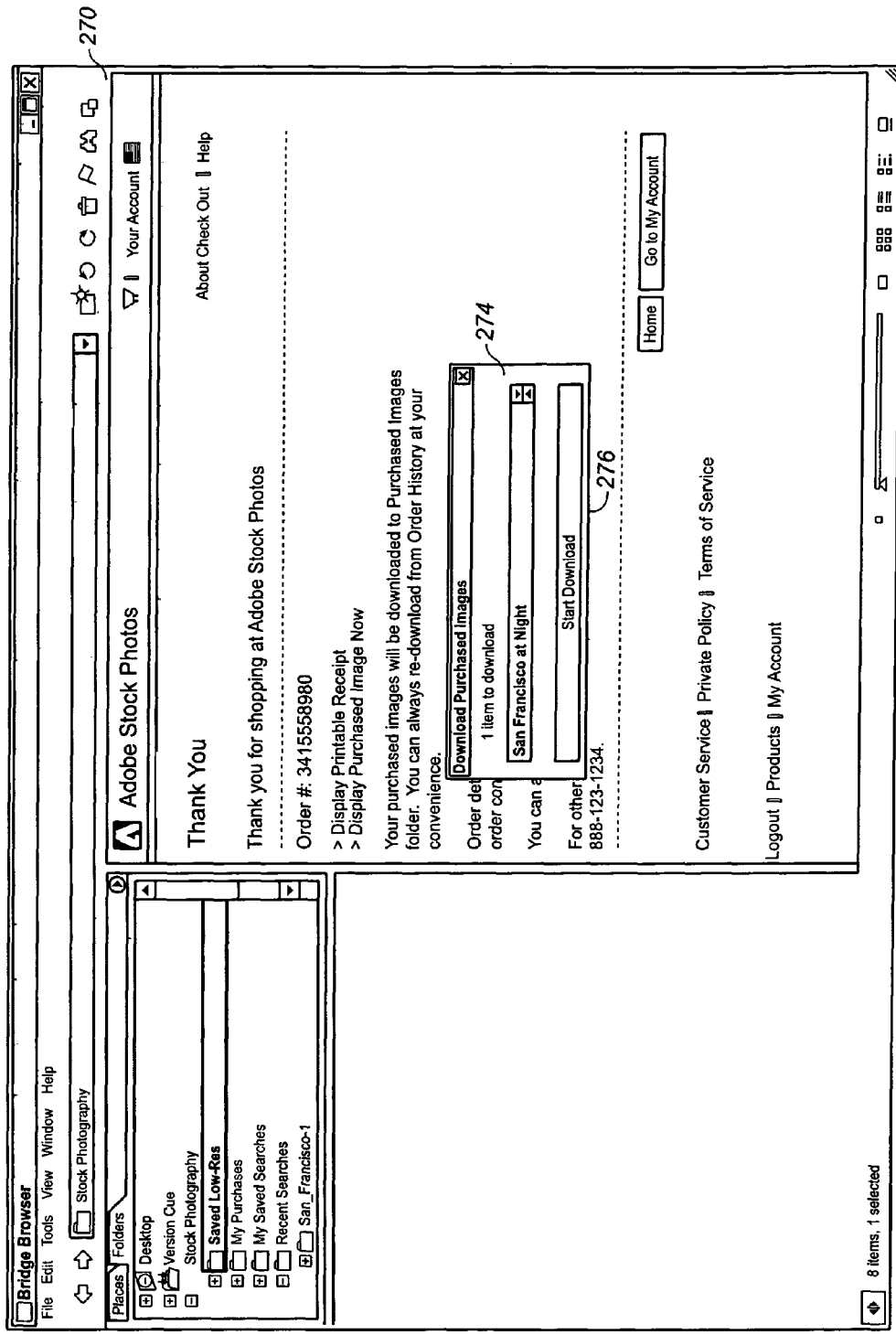
FIG._2g

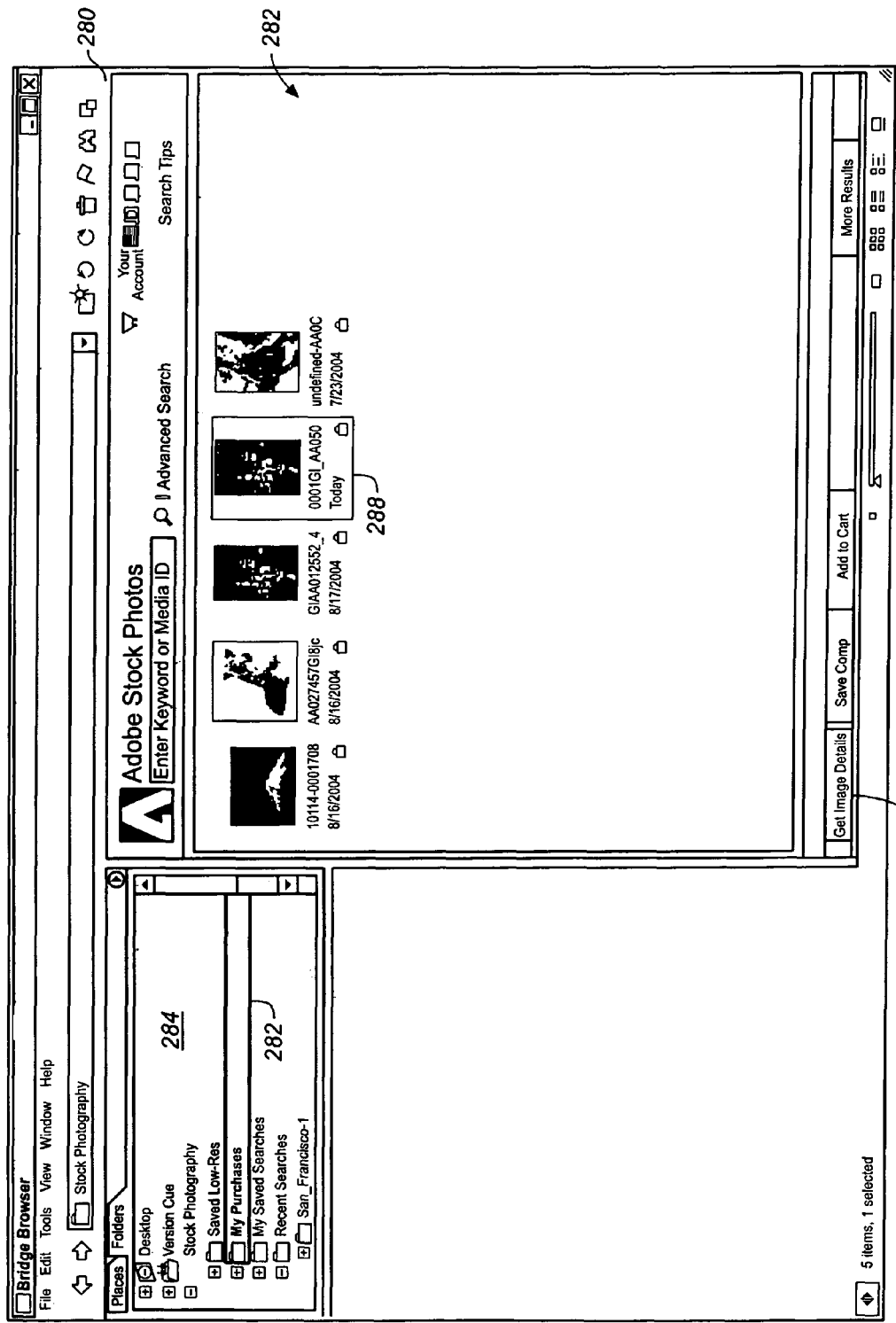
FIG._2h

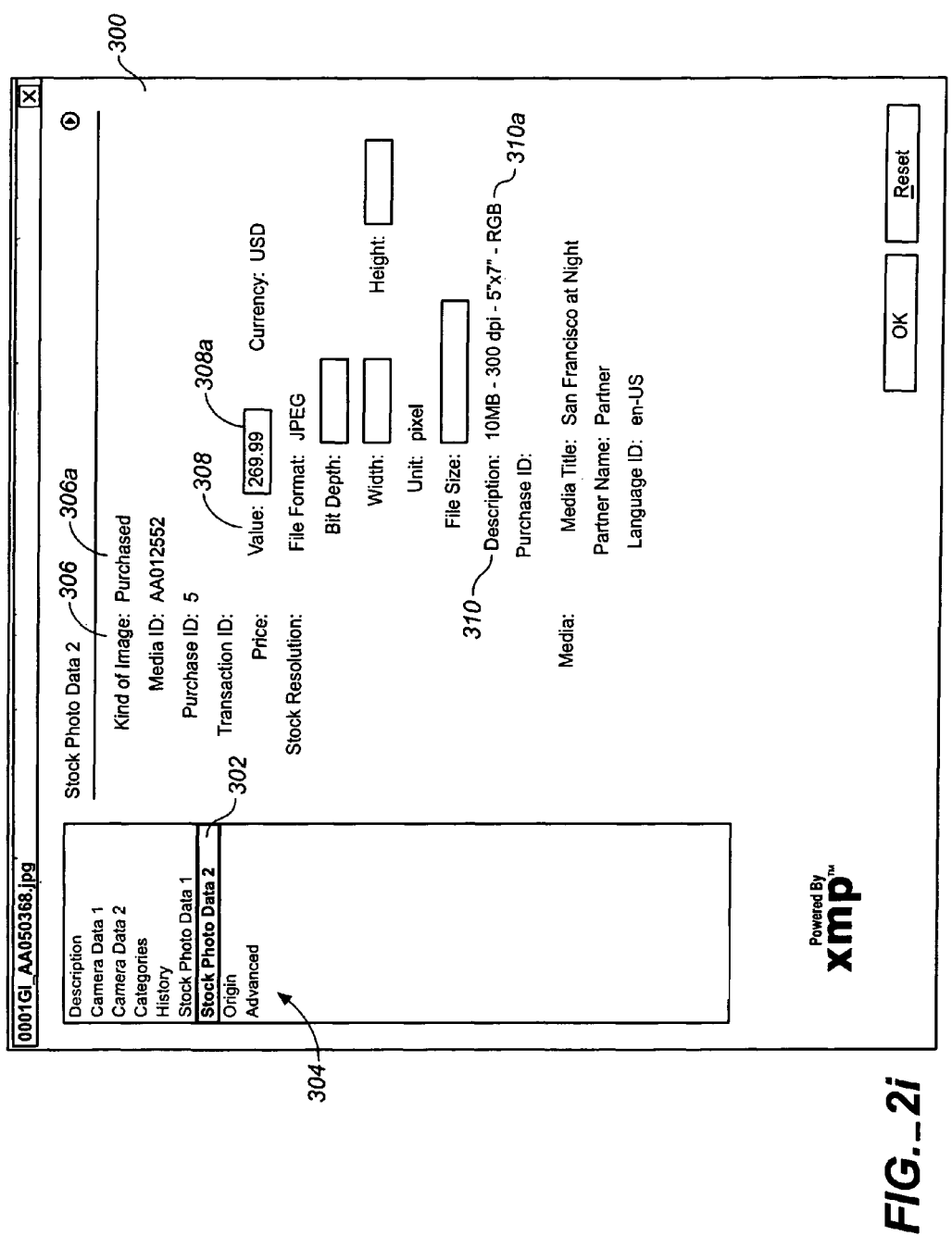
FIG._2i

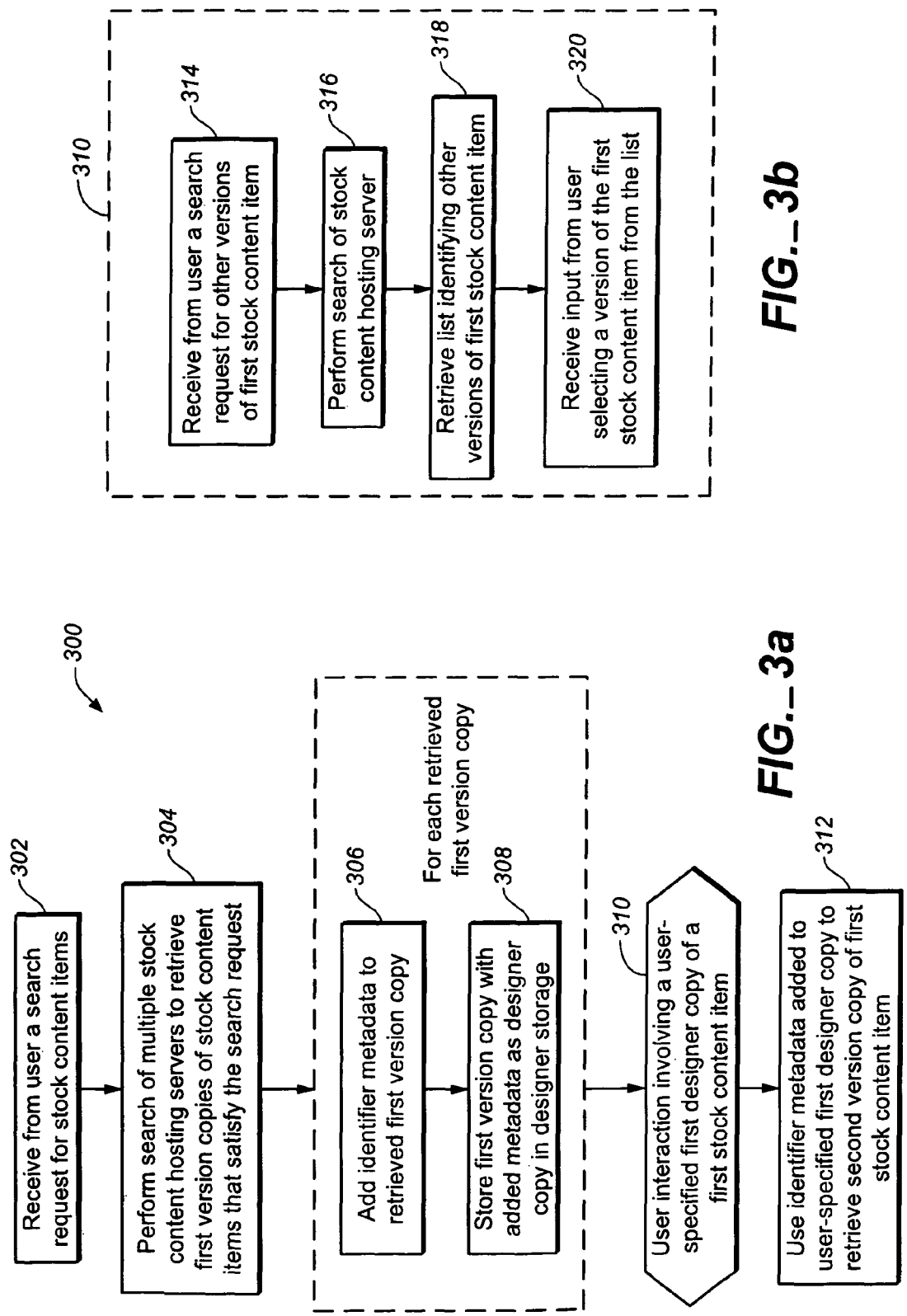
FIG._3b
FIG._3a

ADDING METADATA TO A STOCK CONTENT ITEM

BACKGROUND

This description relates to adding metadata to a stock content item.

Current stock photography merchants provide Web sites through which a graphic designer performs online searches for stock photographs that satisfy one or more search criteria. Typically, in response to a keyword search, the stock photography Web site displays a page of thumbnail versions of stock photographs ("thumbnail images"). The graphic designer views the thumbnail images, makes a selection, and downloads a "comp" image for use in a preliminary page layout. The preliminary page layout that is shown to a customer is referred to as a comprehensive rendering or a "comp" of the graphic designer's idea for a project.

Once the graphic designer receives page layout approval from the customer, the graphic designer returns to each stock photography Web site from which a comp image was downloaded, and performs another search to identify reproduction versions of the image ("reproduction images"). In some instances, the graphic designer uses the filename of the comp image to search the stock photography Web site for the corresponding reproduction images. In other instances, the graphic designer performs the original keyword search, sifts through pages of thumbnail images to locate the appropriate thumbnail image, and uses that thumbnail image to retrieve the corresponding reproduction images.

The stock photography merchant typically offers multiple reproduction images for purchase or license, e.g., a royalty-free license, a rights-managed license, or a flat-rate license. Reproduction images come in different resolutions, image sizes, and file sizes. For example, a low reproduction image has, e.g., a resolution of 72 dpi, an image size of 6"×10", and a file size of 1 MB, a medium reproduction image has, e.g., a resolution of 300 dpi, an image size of 5"×7", and a file size of 10 MB, and a high reproduction image has, e.g., a resolution of 300 dpi, an image size of 9"×12", and a file size of 28 MB.

Once the graphic designer purchases or obtains a license for a reproduction image, the graphic designer can download the reproduction image from the stock photography Web site and use the reproduction image in a variety of ways, including replacing the comp image with the reproduction image.

SUMMARY

In general, in one aspect, the invention provides a method and apparatus, including a computer program product, implementing techniques for retrieving a first version copy, the first version copy being a copy of a first version of a first item of stock content, from a first content hosting server storing a plurality of items of stock content, each item of stock content having one or more stock content versions, each item of stock content having a content identifier that uniquely identifies the item of stock content at the first content hosting server; adding identifier metadata to the first version copy, the identifier metadata including the content identifier of the first item of stock content, and storing the first version copy with the added metadata as a first designer copy in a designer storage for later use in a designer system; and in connection with a user interaction with the designer system involving the first designer copy, using the identifier metadata from the first designer copy to retrieve a second version copy of the first item of stock content from the first content hosting server, the second version copy being a copy of a different, second version of the first item of stock content.

The techniques can include receiving from the user a search request for items of stock content; and performing a search of multiple sources of items of stock content, wherein the first content hosting server is one of the multiple sources of items of stock content, retrieving copies of first versions of items of stock content that satisfy the search request, wherein each of the copies comprises a thumbnail version or a comp version of the respective item of stock content, and storing the retrieved first version copies in the designer storage for later use.

The techniques for performing the search can include sending a search message that invokes a search method provided by a Web service at the first content hosting server.

The user interaction with the designer system involving the first designer copy includes a command action by the user performed with reference to the first designer copy, the command action causing a request to be made for a different, second version of the first item of stock content.

The identifier metadata can include a source identifier that identifies the first content hosting server. The techniques can include receiving from the user a search request for other versions of the first item of stock content; using the identifier metadata from the first designer copy in performing a search of the first content hosting server, and receiving a list identifying other versions of the first item of stock content; receiving from the user an input action selecting a version of the first item of stock content from the list; and retrieving a user-selected second version copy of the first item of stock content from the first content hosting server, wherein the retrieved user-selected second version copy is a reproduction version of the first stock content item.

The user input action can initiate an electronic commerce transaction for purchasing the user-selected second version copy. The techniques can include adding identifier metadata to the second version copy, the identifier metadata including the content identifier of the first item of stock content, and storing the second version copy with the added metadata as a second designer copy in the designer storage for later use in the designer system.

The designer copies can be stored in the designer storage with respective filenames, e.g., server-assigned filenames and/or designer-assigned filenames.

The first designer copy can be included in a page layout, the first designer copy being a comp version of the first stock content item. The techniques can include performing a preflight operation on the page layout, and providing an indicator that a reproduction version of the first item of stock content is required prior to sending the page layout to print. Each stock content item can include a stock photograph, a stock audio clip, a stock video clip, or a stock font.

The invention can be implemented to realize one or more of the following advantages. The metadata that is added to a downloaded first version copy of a first stock content item provides sufficient information to allow a graphic designer's system—including systems and software operating independently of those that downloaded the first version copy—to retrieve other version copies of the first stock content item without requiring the graphic designer to provide information, such as a server-assigned filename of the first version copy or the stock content hosting server from which the first version copy was downloaded.

The graphic designer can rename the server-assigned filename of a version copy of a stock content item stored at the designer storage to a descriptive filename without needing to keep track of the server-assigned filename in order to make subsequent retrievals of version copies of the same stock content item.

The graphic designer can send a page layout including a metadata-enhanced first version copy of a stock content item to a customer for his review. If satisfied, the customer (using his own computing system) can purchase other version copies of the stock content item without knowing the server-assigned filename of the first version copy or the stock content hosting server from which the first version copy was downloaded.

The designer system can display a small icon, watermark, or otherwise visually mark each metadata-enhanced comp images in a page layout in order to aid the graphic designer or the customer in distinguishing comp images from other types of images. The graphic designer or the customer can view the metadata added to a version copy of a stock content item to obtain useful information about the version copy. When the graphic designer preflights a document, the designer system alerts the graphic designer if reproduction images need to be purchased to replace the comp images in the page layout document.

The graphic designer can create a derivative image by editing a comp image or a reproduction image using the designer system, and assign a different filename to the derivative image. The designer system automatically embeds the derivative image with the metadata from its corresponding comp image or reproduction image. In so doing, subsequent purchases of the comp image or the reproduction image can be made by using the metadata embedded in the derivative image.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

FIG. 1 shows the elements of a designer system in accordance with the invention in communication with content providers and a customer system.

FIGS. 2a-2i show user interface windows.

FIGS. 3a-3b are flowcharts of a process for using identifier metadata to retrieve a copy of a stock content item.

Like reference numbers and designations in the various drawings indicate like elements.

DETAILED DESCRIPTION

FIG. 1 shows a designer system 102 that enables a graphic designer 116 to interact through a network 114 (e.g., the Internet or a network that includes the Internet) with stock content providers (e.g., stock photograph merchants) and retrieve copies of stock content items from content hosting servers 106, 108, 110 associated with the stock content providers. The retrieved copies of stock content items can be used in the creation of web and/or printed media projects, such as advertisements, articles, books, newspapers, and magazines.

Each copy of a stock content item that is retrieved by the designer system 102 is embedded with metadata that enables the designer system 102 to retrieve copies of other versions of the stock content item without requiring the graphic designer to provide information identifying the stock content item or the stock content hosting server from which the metadata-enhanced copy was downloaded.

In one implementation, the designer system 102 includes a Web and print publishing program 118, e.g., Adobe® Creative Suite available from Adobe Systems Incorporated. The web and print publishing program 118 enables the graphic designer 116 to create content, lay out print and web pages, conduct electronic reviews of print and web pages with a customer 120 at the customer computer 104, and preflight and prepare the final print and web pages for output. In other implementations, one or more of these functions are provided by separate programs.

In one scenario, the graphic designer 116 uses a page layout component 122 of the publishing program 118 to create a document containing a layout for an article about San Francisco that is to be printed in an upcoming issue of a travel magazine. To layout a page of the article, the graphic designer 116 first defines a desired page size, margins, and columns. The graphic designer 116 then places content, such as text and images on the page. The content may be created within the publishing program 118 itself, e.g., the graphic designer 116 can create a drawing using an illustration tool of the publishing program. The content may be created externally to the publishing program 118, e.g., a photograph that was taken by the graphic designer 116 was imported into the publishing program 118, stored in a designer storage 124 accessible by the publishing program 118, and subsequently retrieved from the designer storage 124 for placement in the page.

The graphic designer 116 can use the designer system 102 to perform a search of the content hosting servers 106, 108, 110 to identify and subsequently retrieve stock photographs that may be used in the page layout. Each content hosting server 106, 108, 110 has access to one or more databases 106a, 108a, 110a of stock content files embodied in media, such as still photographs, graphic files, audio recordings, or video recordings. Each stock content file includes a version of a stock content item. Each stock content item can have one or more versions as described below.

Each stock content file has a server-assigned filename that uniquely identifies the file at the content hosting server. By way of example, suppose the database 106a stores files of stock photographs each having a server-assigned filename of the form [ID][suffix], where the "ID" portion of the server-assigned filename is a content identifier that includes a string of alphanumeric characters that identifies the stock content item, and the "suffix" portion of the server-assigned filename is a version identifier that includes a one-digit suffix that identifies the version of the stock content item. The "ID" portion of the server-assigned filenames of five of the stock content files may be the same, while the "suffix" portions depend on the resolution of the stock photographs provided by the respective files, e.g., −1 for a "thumbnail" image, −2 for a "comp" image, −3 for a "low" reproduction image, −4 for a "medium" reproduction image, and −5 for a "high" reproduction image. Other file naming conventions may be used.

Each database 106a, 108a, 110a includes, for each stored content file, indexing information by which each content file can be identified and selectively retrieved from the database. The content files can be indexed by a background, venue, organization, institution or product depicted by the stock content item in a content file. Additional examples of content index attributes include a time or time period to which the content file relates or was captured, a setting or subject depicted in the content file, the individuals or subject matter depicted in or captured by the content file, to name a few.

In one implementation, the designer system 102 includes a Web service client component 126 that interacts with Web service interfaces provided by the stock content providers.

Each stock content provider makes a stock content Web service 106b, 108b, 110b available over the network 114 through its respective content hosting server 106, 108, 110. Each Web service 106b, 108b, 110b exposes a set of methods including a photo search method that Web service client components can invoke by sending search messages, e.g., Simple Object Access Protocol (SOAP) messages that represent remote procedure calls. The body of each search message identifies the Web service method to be invoked, and one or more parameters to the method. After the remote procedure call is executed, the Web service 106b, 108b, 110b sends the calling Web service client component a return message containing the results of the procedure call.

In the case of a photo search method of the Web service 106b, for example, the Web service 106b queries a database 106a to identify stock content items that satisfy the parameters set forth in the search message, and returns the results of the database query to the calling Web service client component, where further action may be taken with respect to the database query results as discussed below with reference to a page layout example.

FIG. 2a shows an implementation of a user interface 200 that is part of a Web service client component 126 of the designer system 102. The example user interface 200 includes a search field 202 in which the graphic designer 116 provides one or more keywords, which in this case is a single keyword: "San Francisco".

When the graphic designer 116 clicks on the icon 204 to the right of the search field 202, the user action causes the publishing program 118 to generate a search message for each stock content Web service 106b, 108b, 110b in the system 100. Each search message identifies a photo search method of each respective Web service 106b, 108b, 110b as the method to be invoked, and includes the user-specified keyword "San Francisco" as a parameter to the photo search method. The search messages are simultaneously sent to all of the content hosting servers 106, 108, 110 having respective stock content Web services 106b, 108b, 110b.

Upon receipt of the search message, each content hosting server 106, 108, 110 processes the search message and sends the relevant data contained in the search message to the Web service 106a, 108a, 110a exposing the photo search method. The Web service 106b, for example, performs a search of the database 106a associated with the content hosting server 106 to identify content files having stock content items that match the "San Francisco" parameter. In one implementation, the Web service 106b filters the identified content files and selectively retrieves the identified content files having server-assigned filenames with the -1 suffix, i.e., the content files ("thumbnail content files") including thumbnail images. In another implementation, the Web service 106b only identifies thumbnail content files having stock content items that match the "San Francisco" parameter. The Web service 106b then sends copies of the identified thumbnail content files in a return message to the calling Web service client component 126.

The Web service client component 126 receives the messages returned by the Web services 106b, 108b, 110b, and passes the received messages to the publishing program 118. The publishing program 118 adds Extensible Metadata Platform (XMP) metadata to each thumbnail image using techniques described in the XMP Specification (available from Adobe Systems Incorporated at http://www.adobe.com). For each thumbnail image, the publishing program 118 adds metadata that includes the content identifier of the respective stock content item, and a source identifier that identifies, to the publishing program 118, the content hosting server 106, 108, 110 from which the thumbnail content file was retrieved.

In one implementation, the publishing program 118 stores each copy of a thumbnail content file having a metadata-enhanced thumbnail image as a designer copy in the designer storage 124. Each designer copy of a thumbnail content file is initially stored with its server-assigned filename or a filename ("designer-assigned") assigned by the publishing program 118. If desired, the graphic designer can change a server-assigned or designer-assigned filename to one of his choosing, e.g., a descriptive filename.

The publishing program 118 renders the thumbnail images that match the "San Francisco" parameter in a "Content" window 212 of the user interface 210, as shown in FIG. 2b. The displayed thumbnail images include all of the thumbnail images retrieved from multiple content hosting servers 106, 108, 110 in response to a search for thumbnail images that match the "San Francisco" parameter. If desired, the graphic designer 116 can view the metadata that was added to a thumbnail image by selecting a displayed thumbnail image, e.g., the thumbnail image 214, and clicking on the "Get Image Details" button 216 provided on the bottom of the "Content" window 212. This user action causes the publishing program 118 to display a File Info dialog box.

FIG. 2c shows a File Info dialog box 220 associated with the thumbnail image 214. The File Info dialog box 220 is divided into a series of panels that can be accessed by clicking on labels displayed in a left-hand pane 222 of the dialog box. For example, to access a "Stock Photo Data 2" panel, the graphic designer 116 clicks on the "Stock Photo Data 2" label 224 to reveal a list of metadata properties, such as "Kind of Image" 226, "Media ID" 228, "Value" 230, "Currency" 232, "Description" 234, "Partner Name" 236, and so on. Some of the metadata properties have values that were assigned by the publishing program when the metadata was added to the thumbnail image 214. For example, the "Kind of Image" property 226 has a "Thumbnail" value 226a to indicate that the stock content item is a thumbnail image. The "Media ID" property 228 has a "AA012552" value 228a, which corresponds to the content identifier of the thumbnail image 214. The "Partner Name" property 236 has a source identifier value of "Partner" 236a to indicate that the thumbnail image 214 was retrieved from a database associated with Partner Images.

Returning to FIG. 2b, suppose, for example, that the graphic designer 116 is interested in obtaining a comp image corresponding to the thumbnail image 214. To do so, the graphic designer 116 can drag-and-drop the thumbnail image 214 into a "My Comps" folder (not shown) provided in a "Folder" window 218 of the user interface 210, right-click on the thumbnail image 214 and select a "Save Comp" option provided in a pop-up menu (not shown), or select the thumbnail image 214 and click on the "Save Comp" button 220 provided on the bottom of the Content window 212. Any one of these user actions causes the Web service client component 126 to extract the "Partner" value and the "AA012552" value from the metadata that was added to the thumbnail image 214, generate a search message identifying the photo search method as the method to be invoked using the extracted "AA012552" value and a "-2" value (to indicate that the desired image is a comp image) as parameters, and send the search message to the Partner content hosting server (e.g., content hosting server 106).

The search message invokes the photo search method exposed by the Web service 106b at the Partner content hosting server 106. The Web service 106b performs a search of the database 106a to identify the content file ("comp content file") that matches the search parameters, and sends a return message including a copy of the comp content file to the calling Web service client component 126.

The Web service client component 126 receives the return message, and passes the received message to the publishing program 118. The publishing program 118 adds metadata to the comp image provided in the returned comp content file. The added metadata includes the content identifier of the comp image (i.e., "AA012552"), and a source identifier (i.e., "Partner") that identifies, to the publishing program 118, the content hosting server 106 from which the comp content file was retrieved.

In one implementation, the publishing program 118 stores a copy of the comp content file having the metadata-enhanced comp image as a designer copy in the designer storage 124. The publishing program 118 initially stores the designer copy of the comp content file with its server-assigned filename or a designer-assigned filename.

The publishing program 118 renders the comp images, including the comp image 254, provided in the designer comp content files in a "Content" window 252 of a user interface 250, as shown in FIG. 2d. Suppose, for example, that the graphic designer 116 uses the comp image 254 in a preliminary layout for a page of an article about San Francisco. Once the graphic designer 116 is satisfied with the preliminary page layout, the graphic designer 116 can use the publishing program 118 to export the page layout to an Adobe® PDF document, and e-mail the PDF document to the customer 120 at the customer system 104 for review.

Once the page layout is approved, the graphic designer 116 at the designer system 102 uses a preflight component 128 of the publishing program 118 to determine if all of the elements necessary to print the document containing the page layout are included and useable. As part of the preflight operation, the publishing program 118 provides the page layout on a user interface and indicates to the graphic designer 116 that a reproduction version of each comp image is needed prior to sending the article to print. This can be done in a variety of ways. For example, the publishing program 118 can surround each comp image with a red box to visually indicate to the graphic designer 116 that a reproduction image is needed.

To obtain a reproduction image corresponding to the comp image 254, the graphic designer 116 navigates to the user interface 250 (FIG. 2d), selects the comp image 254 and clicks on the "Add to Cart" button 256 provided on the bottom of the Content window 252. This user action causes the Web service client component 126 to extract the "Partner" value and the "AA012552" value from the metadata that was added to the comp image 254, generate a search message identifying the photo search method as the method to be invoked using the extracted "AA012552" value, and send the search message to the Partner Web service 106b. The Partner Web service 106b returns a message including a list of available reproduction images that match the "AA012552" parameter. Upon receipt of the return message, the publishing program 118 displays the list of available reproduction images in a user interface 260, as shown in FIG. 2e. Through the user interface 260, the graphic designer 116 selects the desired reproduction image (e.g., the "medium" reproduction image having a resolution of 300 dpi, an image size of 5"×7", and a file size of 10 MB), and adds the selected reproduction image item to an electronic shopping cart. The graphic designer can click on the "Continue Browsing" button 262 on the user interface 260 to add other selected reproduction image items to the shopping cart. The selected reproduction image items in the shopping cart can be associated with a single content hosting server or multiple content hosting servers.

To purchase the items in the shopping cart list, the graphic designer 116 clicks on the "Check Out" button 264 on the user interface 260, and enters customer information (e.g., billing and payment information), which can be transmitted to the electronic commerce server 112 for financial settlement and processing via a Web service call. Once the financial settlement processing is completed, the electronic commerce server 112 sends a purchase transaction message to the publishing program 118. The purchase transaction message includes an order number (e.g., "3415558980") and a final transaction list that identifies the reproduction images that have been purchased and the content hosting servers that store the purchased reproduction images.

In one implementation, upon receipt of the purchase transaction message, the publishing program 118 displays the user interface 270 shown in FIG. 2f. When the graphic designer 116 clicks on the "Display Purchased Image Now" link 272 provided on the user interface 270, the publishing program 118 displays a Download Purchased Images dialog box 274 on the user interface 270, as shown in FIG. g. The graphic designer 116 scrolls through the list provided in the Download Purchased Images dialog box 274 to select the purchased reproduction image to be retrieved and clicks on the "Start Download" button 276 to retrieve a content file including the selected reproduction image from, e.g., the Partner content hosting server 106.

In one implementation, the publishing program 118 adds metadata to the reproduction image provided in each retrieved reproduction content file and stores each copy of a reproduction content file having a metadata-enhanced reproduction image as a designer copy in the designer storage 124. The added metadata includes a content identifier and a source identifier that identifies, to the publishing program 118, the content hosting server from which the respective reproduction content file was retrieved.

When the graphic designer 116 clicks on a "My Purchases" folder 282 provided in the "Folder" window 284 of the user interface 280, the publishing program 118 renders thumbnail images corresponding to the reproduction images provided in the designer copies of reproduction content files in the "Content" window 286 of the user interface 280, as shown in FIG. 2h. If desired, the graphic designer 116 can view the metadata that was added to a particular reproduction image by selecting a displayed thumbnail image, e.g., the thumbnail image 288, and clicking on the "Get Image Details" button 290 provided at the bottom of the "Content" window 286. This user action causes the publishing program 118 to display a File Info dialog box on the user interface.

FIG. 2i shows a File Info dialog box 300 associated with the reproduction image corresponding to the selected thumbnail image 288. The File Info dialog box 300 includes a "Stock Photo Data 2" panel that can be accessed by clicking on the "Stock Photo Data 2" label displayed in the left-hand pane. The "Stock Photo Data 2" panel of FIG. 2i includes the same list of metadata properties, and some of the same values as the "Stock Photo Data 2" panel of FIG. 2c. However, some of the metadata properties are associated with different values. For example, the "Kind of Image" property 306 has a "Purchased" value 306a to indicate that the reproduction image has been purchased. The "Value" property 308 is now associated with a "269.99" value 308a that indicates the cost of purchasing the reproduction image. The "Description" property 310 is associated with a "10 MB-300 dpi-5"×7"-RGB" value 310a that indicates that the content file includes a "medium" reproduction image having a resolution of 300 dpi, an image size of 5"×7", and a file size of 10 MB.

Once the graphic designer 116 has replaced all of the comp images in the page layout with the corresponding reproduction images stored in the designer storage 124, the publishing program 118 terminates the preflight operation (once all other preflight requirements are satisfied) and the article is ready for print.

Thus, as shown in FIG. 3, the designer system 102 can perform the following process (300) of receiving (302) from a user a search request for stock content items, and performing (304) a search of multiple content hosting servers to retrieve first version copies of stock content items that satisfy the search request. For each first version copy of a stock content item that is retrieved, the process includes adding (306) identifier metadata to the first version copy, and storing (308) the first version copy having the added identifier metadata as a designer copy in a designer storage for later use in the designer system. The identifier metadata that is added to the first version copy includes a content identifier that uniquely identifies the respective stock content item at the content hosting server. In connection with a user interaction (310) with the designer system involving a first designer copy ("user-specified first designer copy") of a first stock content item stored in the designer storage, the process (300) includes using (312) the identifier metadata from the user-specified first designer copy to retrieve a second version copy of the first stock content item from the content hosting server.

In one scenario shown in FIG. 3b, the user interaction (310) involves receiving (312) from the user a search request for other versions of the first stock content item, use the identifier metadata from the first designer copy in performing (316) a search of the content hosting server, retrieving (318) a list identifying other versions of the first stock content item, and receiving (320) from the user an input action selecting a version of the first stock content item from the retrieved list.

The invention and all of the functional operations described in this specification can be implemented in digital electronic circuitry, or in computer hardware, firmware, software, or in combinations of them. The invention can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results. In addition to stock photographs, the stock content items can include audio clips, video clips, or fonts. The designer system can be implemented in a server-based solution that interacts with the graphic designer through a Web browser and that interacts with the stock content hosting servers, as has been described.

What is claimed is:

1. A computer program product, tangibly embodied in a computer-readable medium, comprising instructions operable to cause a data processing apparatus to:
retrieve a first version copy, the first version copy being a copy of a first version of a first item of stock content, from a first content hosting server storing a plurality of items of stock content, each item of stock content having one or more stock content versions, each item of stock content having a content identifier that uniquely identifies the item of stock content at the first content hosting server and a version identifier that identifies stock resolution, wherein a search message that complies with the Simple Object Access Protocol initiates retrieval of the first version copy;

add identifier metadata to the first version copy, the identifier metadata including the content identifier of the first item of stock content, and store the first version copy with the added metadata as a first designer copy in a designer storage for later use in a designer system, wherein the first version copy includes a preliminary version of the first item of stock content, the identifier metadata including extensible metadata and being associated with information about whether an electronic commerce transaction for purchase of a second version copy of the first item of stock content has occurred; and in connection with a user interaction with the designer system involving the first designer copy, use the identifier metadata from the first designer copy to retrieve the second version copy of the first item of stock content from the first content hosting server, the second version copy being a copy of a different, second version of the first item of stock content, wherein the user interaction includes a request for versions of the first item of stock content, different from the first version, and is absent the designer system being provided the content identifier.

2. The computer program product of claim 1, further comprising instructions to:
receive from the user a search request for items of stock content; and
perform a search of multiple sources of items of stock content, wherein the first content hosting server is one of the multiple sources of items of stock content, retrieve copies of first versions of items of stock content that satisfy the search request, wherein each of the copies comprises a thumbnail version or a comp version of the respective item of stock content, and store the retrieved first version copies in the designer storage for later use.

3. The computer program product of claim 2, wherein instructions to perform the search comprise instructions to:
send a search message that invokes a search method provided by a Web service at the first content hosting server.

4. The computer program product of claim 1, wherein the user interaction with the designer system involving the first designer copy includes a command action by the user performed with reference to the first designer copy, the command action causing a request to be made for a different, second version of the first item of stock content.

5. The computer program product of claim 1, wherein the identifier metadata includes a source identifier that identifies the first content hosting server, and wherein instructions to retrieve a second version copy of the first item of stock content comprises instructions to:
receive from the user a search request for other versions of the first item of stock content;
use the identifier metadata from the first designer copy in performing a search of the first content hosting server, and receive a list identifying other versions of the first item of stock content;
receive from the user an input action selecting a version of the first item of stock content from the list; and
retrieve a user selected second version copy of the first item of stock content from the first content hosting server, wherein the retrieved user-selected second version copy is a reproduction version of the first stock content item.

6. The computer program product of claim 5, wherein the user input action initiates an electronic commerce transaction for purchasing the user-selected second version copy.

7. The computer program product of claim 1, further comprising instructions to:
add identifier metadata to the second version copy, the identifier metadata including the content identifier of the first item of stock content, and store the second version copy with the added metadata as a second designer copy in the designer storage for later use in the designer system.

8. The computer program product of claim 1, wherein instructions to store the first version copy in the designer storage comprise instructions to store the first version copy with a filename comprising a server-assigned filename or a designer-assigned filename.

9. The computer program product of claim 1, wherein the first designer copy is included in a page layout, the first designer copy being a comp version of the first item of stock content, the product further comprising instructions to:
perform a preflight operation on the page layout, and provide an indicator that a reproduction version of the first item of stock content is required prior to sending the page layout to print.

10. The computer program product of claim 1, wherein each stock content item comprises a stock photograph, a stock audio clip, a stock video clip, or a stock font.

11. A method comprising:
retrieving a first version copy, the first version copy being a copy of a first version of a first item of stock content, from a first content hosting server storing a plurality of items of stock content, each item of stock content having one or more stock content versions, each item of stock content having a content identifier that uniquely identifies the item of stock content at the first content hosting server and a version identifier that identifies stock resolution, wherein a search message that complies with the Simple Object Access Protocol initiates retrieval of the first version copy;
adding identifier metadata to the first version copy, the identifier metadata including the content identifier of the first item of stock content, and storing the first version copy with the added metadata as a first designer copy in a designer storage for later use in a designer system, wherein the first version copy includes a preliminary version of the first item of stock content, the identifier metadata including extensible metadata and being associated with information about whether an electronic commerce transaction for purchase of a second version copy of the first item of stock content has occurred; and
in connection with a user interaction with the designer system involving the first designer copy, using the identifier metadata from the first designer copy to retrieve the second version copy of the first item of stock content from the first content hosting server, the second version copy being a copy of a different, second version of the first item of stock content, wherein the user interaction includes a request for versions of the first item of stock content, different from the first version, and is absent the designer system being provided the content identifier.

12. The method of claim 11, further comprising:
receiving from the user a search request for items of stock content; and
performing a search of multiple sources of items of stock content, wherein the first content hosting server is one of the multiple sources of items of stock content, retrieving copies of first versions of items of stock content that satisfy the search request, wherein each of the copies comprises a thumbnail version or a comp version of the respective item of stock content, and storing the retrieved first version copies in the designer storage for later use.

13. The method of claim 12, wherein performing the search comprises sending a search message that invokes a search method provided by a Web service at the first content hosting server.

14. The method of claim 11, wherein the user interaction with the designer system involving the first designer copy includes a command action by the user performed with reference to the first designer copy, the command action causing a request to be made for a different, second version of the first item of stock content.

15. The method of claim 11, wherein the identifier metadata includes a source identifier that identifies the first content hosting server, the method further comprising:
receiving from the user a search request for other versions of the first item of stock content;
using the identifier metadata from the first designer copy in performing a search of the first content hosting server, and receiving a list identifying other versions of the first item of stock content;
receiving from the user an input action selecting a version of the first item of stock content from the list; and
retrieving a user selected second version copy of the first item of stock content from the first content hosting server, wherein the retrieved user-selected second version copy is a reproduction version of the first stock content item.

16. The method of claim 15, wherein the user input action initiates an electronic commerce transaction for purchasing the user-selected second version copy.

17. The method of claim 11, further comprising adding identifier metadata to the second version copy, the identifier metadata including the content identifier of the first item of stock content, and storing the second version copy with the added metadata as a second designer copy in the designer storage for later use in the designer system.

18. The method of claim 11, wherein storing the first version copy in the designer storage comprises storing the first version copy with a filename comprising a server-assigned filename or a designer-assigned filename.

19. The method of claim 11, wherein the first designer copy is included in a page layout, the first designer copy being a comp version of the first stock content item, the method further comprising:
performing a preflight operation on the page layout, and providing an indicator that a reproduction version of the first item of stock content is required prior to sending the page layout to print.

20. The method of claim 11, wherein each stock content item comprises a stock photograph, a stock audio clip, a stock video clip, or a stock font.

21. A designer system comprising:
a computer system comprising,
a client component for retrieving a first version copy, the first version copy being a copy of a first version of a first item of stock content, from a first content hosting server storing a plurality of items of stock content, each item of stock content having one or more stock content versions, each item of stock content having a content identifier that uniquely identifies the item of stock content at the first content hosting server and a version identifier that identifies stock resolution, wherein a search message that complies with the Simple Object Access Protocol initiates retrieval of the first version copy;
a publishing program for adding identifier metadata to the first version copy, the identifier metadata including the content identifier of the first item of stock content, and storing the first version copy with the added metadata as a first designer copy in a designer storage for later use in the designer system, wherein the first version copy includes a preliminary version of the first item of stock content, the identifier metadata including extensible metadata and being associated with information about whether an electronic commerce transaction for purchase of a second version copy of the first item of stock content has occurred; and
wherein, the client component is capable of using the identifier metadata from the first designer copy, in connection with a user interaction with the designer system involving the first designer copy, to retrieve the second version copy of the first item of stock content from the first content hosting server, the second version copy being a copy of a different, second version of the first item of stock content, wherein the user interaction includes a request for versions of the first item of stock content, different from the first version, and is absent the designer system being provided the content identifier.

22. The designer system of claim 21 in which upon receiving from the user a search request for items of stock content, a search is performed of multiple sources of items of stock content, wherein the first content hosting server is one of the multiple sources of items of stock content, retrieving copies of first versions of items of stock content that satisfy the search request, wherein each of the copies comprises a thumbnail version or a comp version of the respective item of stock content, and storing the retrieved first version copies in the designer storage for later use.

23. The designer system of claim 22 in which performing the search comprises sending a search message that invokes a search method provided by a Web service at the first content hosting server.

24. The designer system of claim 21 in which the user interaction with the designer system involving the first designer copy includes a command action by the user performed with reference to the first designer copy, the command action causing a request to be made for a different, second version of the first item of stock content.

25. The designer system of claim 21 wherein the identifier metadata includes a source identifier that identifies the first content hosting server, a search request is received from a user for other versions of the first item of stock content, the identifier metadata from the first designer copy is used in performing a search of the first content hosting server, and receiving a list identifying other versions of the first item of stock content, an input action is received from the user for selecting a version of the first item of stock content from the list, and a user selected second version copy of the first item of stock content is retrieved from the first content hosting server, wherein the retrieved user-selected second version copy is a reproduction version of the first stock content item.

26. The designer system of claim 25 in which the user input action initiates an electronic commerce transaction for purchasing the user-selected second version copy.

27. The designer system of claim 21 in which identifier metadata is added to the second version copy, the identifier metadata including the content identifier of the first item of stock content, and storing the second version copy with the added metadata as a second designer copy in the designer storage for later use in the designer system.

28. The designer system of claim 21 in which the first version copy is stored in the designer storage comprises storing the first version copy with a filename comprising a server-assigned filename or a designer-assigned filename.

29. The designer system of claim 21 in which the first designer copy is included in a page layout, the first designer copy being a comp version of the first stock content item, a preflight operation is performed on the page layout, and an indicator that a reproduction version of the first item of stock content is required prior is provided to sending the page layout to print.

30. The designer system of claim 21 in which each stock content item comprises a stock photograph, a stock audio clip, a stock video clip, or a stock font.

* * * * *